United States Patent
Oba et al.

(10) Patent No.: US 11,242,481 B2
(45) Date of Patent: Feb. 8, 2022

(54) WAVELENGTH CONVERSION FILM AND BACKLIGHT UNIT

(71) Applicant: FUJIFILM Corporation, Tokyo (JP)

(72) Inventors: Tatsuya Oba, Kanagawa (JP); Satoshi Kuniyasu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 257 days.

(21) Appl. No.: 16/440,091

(22) Filed: Jun. 13, 2019

(65) Prior Publication Data

US 2019/0292446 A1 Sep. 26, 2019

Related U.S. Application Data

(63) Continuation of application No. PCT/JP2017/045503, filed on Dec. 19, 2017.

(30) Foreign Application Priority Data

Dec. 19, 2016 (JP) .............................. JP2016-245628

(51) Int. Cl.
  *C09K 11/00* (2006.01)
  *C09K 11/02* (2006.01)
  (Continued)

(52) U.S. Cl.
  CPC .......... *C09K 11/02* (2013.01); *C09K 11/0883* (2013.01); *C09K 11/56* (2013.01);
  (Continued)

(58) Field of Classification Search
  CPC ... C09K 11/02; C09K 11/0083; C09K 11/703; C09K 11/883
  See application file for complete search history.

(56) References Cited

U.S. PATENT DOCUMENTS

2012/0256141 A1 10/2012 Nick et al.
2013/0271955 A1* 10/2013 Van Bommel ......... B82Y 30/00
  362/84

(Continued)

FOREIGN PATENT DOCUMENTS

CN 106133562 A 11/2016
JP 2007-262375 A 10/2007
(Continued)

OTHER PUBLICATIONS

Office Action, issued by the State Intellectual Property Office dated Nov. 10, 2020, in connection with Chinese Patent Application No. 201780077542.0.

(Continued)

*Primary Examiner* — Gerald J Sufleta, II
(74) *Attorney, Agent, or Firm* — Edwards Neils LLC; Jean C. Edwards, Esq.

(57) ABSTRACT

Provided is a thin wavelength conversion film in which a phosphor can be uniformly dispersed and deterioration of the phosphor caused by oxygen can also be prevented; and a backlight unit including the wavelength conversion film. The wavelength conversion film includes a wavelength conversion layer and a substrate, in which the wavelength conversion layer includes a binder and particles including a phosphor, an oxygen permeability coefficient of the binder is 0.01 $(cc \cdot mm)/(m^2 \cdot atm)$ or lower, an oxygen permeability coefficient of the matrix is 10 to 1000 $(cc \cdot mm)/(m^2 \cdot day \cdot atm)$, and a content of the particles in the wavelength conversion layer is 3 to 30 vol %.

9 Claims, 1 Drawing Sheet

(51) Int. Cl.

| | | |
|---|---|---|
| *C09K 11/08* | (2006.01) | |
| *C09K 11/70* | (2006.01) | |
| *C09K 11/88* | (2006.01) | |
| *G02F 1/13357* | (2006.01) | |
| *C09K 11/56* | (2006.01) | |
| *F21V 9/00* | (2018.01) | |
| *G02B 5/20* | (2006.01) | |
| *F21S 2/00* | (2016.01) | |
| *F21V 9/08* | (2018.01) | |
| *G02F 1/1335* | (2006.01) | |

(52) U.S. Cl.
CPC .......... *C09K 11/70* (2013.01); *C09K 11/703* (2013.01); *C09K 11/883* (2013.01); *F21S 2/00* (2013.01); *F21V 9/00* (2013.01); *F21V 9/08* (2013.01); *G02B 5/20* (2013.01); *G02F 1/133603* (2013.01); *G02F 1/133611* (2013.01); *G02F 1/133614* (2021.01); *G02F 2202/36* (2013.01)

(56) References Cited

U.S. PATENT DOCUMENTS

| | | | | |
|---|---|---|---|---|
| 2014/0153217 | A1* | 6/2014 | Kang | G02F 2/02 362/84 |
| 2015/0047765 | A1* | 2/2015 | Vo | C09K 11/02 156/60 |
| 2015/0275078 | A1 | 10/2015 | Vo et al. | |
| 2016/0161066 | A1 | 6/2016 | Sung et al. | |
| 2017/0017021 | A1 | 1/2017 | Tokinoya et al. | |
| 2017/0030532 | A1* | 2/2017 | Ryohwa | C09K 11/025 |
| 2017/0166807 | A1* | 6/2017 | Kuzumoto | C09K 11/025 |
| 2017/0232718 | A1 | 8/2017 | Iwase | |
| 2017/0277002 | A1 | 9/2017 | Yamada et al. | |
| 2017/0327737 | A1 | 11/2017 | Yamaki et al. | |
| 2018/0016490 | A1* | 1/2018 | Shin | C09K 11/06 |
| 2018/0246373 | A1* | 8/2018 | Nakamura | G02B 5/0231 |

FOREIGN PATENT DOCUMENTS

| | | |
|---|---|---|
| JP | 4960645 B2 | 6/2012 |
| JP | 2014-508818 A | 4/2014 |
| JP | 5744033 B2 | 7/2015 |
| JP | 2016-093956 A | 5/2016 |
| JP | 2016-111292 A | 6/2016 |
| JP | 2016-536641 A | 11/2016 |
| WO | 2015/019941 A1 | 2/2015 |
| WO | 2015/025950 A1 | 2/2015 |
| WO | 2016/088646 A1 | 6/2016 |

OTHER PUBLICATIONS

International Search Report issued in PCT/JP2017/045503 dated Mar. 20, 2018.
Written Opinion issued in PCT/JP2017/045503 dated Mar. 20, 2018.
International Preliminary Report on Patentability completed by WIPO dated Jun. 25, 2019 in connection with International Patent Application No. PCT/JP2017/045503.
Office Action, issued by the Japanese Patent Office dated Mar. 17, 2020, in connection with Japanese Patent Application No. 2018-557998.

* cited by examiner

WAVELENGTH CONVERSION FILM AND BACKLIGHT UNIT

CROSS-REFERENCE TO RELATED APPLICATIONS

This application is a Continuation of PCT International Application No. PCT/JP2017/045503 filed on Dec. 19, 2017, which was published under Article 21(2) in Japanese, and which claims priority under 35 U.S.C. § 119(a) to Japanese Patent Application No. 2016-245628 filed on Dec. 19, 2016. The above applications are hereby expressly incorporated by reference, in their entirety, into the present application.

BACKGROUND OF THE INVENTION

1. Field of the Invention

The present invention relates to a wavelength conversion film and a backlight unit including the wavelength conversion film.

2. Description of the Related Art

A liquid crystal display device has been more widely used as a space-saving image display device having low power consumption. In addition, recently, in order to improve the performance of a liquid crystal display device, a further reduction in power consumption, improvement of color reproducibility, and the like are required.

Along with a reduction in the power consumption of a backlight of a liquid crystal display device, the use of a wavelength conversion film that converts the wavelength of incidence light is known in order to increase the light use efficiency and to improve the color reproducibility. In addition, as the wavelength conversion film, a wavelength conversion film using quantum dots is known.

The quantum dot is a crystal having an electronic state in which all the three-dimensional moving directions are restricted. In a case where a nanoparticle of a semiconductor is three-dimensionally surrounded by a high potential barrier, this nanoparticle is a quantum dot. The quantum dot exhibits various quantum effects. For example, "quantum size effect" of making of the density of electronic states (energy level) discrete is exhibited. According to this quantum size effect, the absorption wavelength and emission wavelength of light can be controlled by changing the size of quantum dots.

For example, a wavelength conversion film using quantum dots has a configuration in which a wavelength conversion layer (quantum dot layer) in which quantum dots are dispersed in a binder formed of a resin or the like is sandwiched between substrates such as a resin film.

However, in this wavelength conversion film, the wavelength conversion layer becomes thick, which is not suitable for a recent demand for a reduction in the thickness of a liquid crystal display device.

In addition, quantum dots are likely to deteriorate due to oxygen and have a problem in that the emission intensity decreases due to a photooxidation reaction. As a method of solving this problem, a method of using a gas barrier film having high gas barrier properties (oxygen barrier properties) for a substrate can be considered. However, the gas barrier film having high gas barrier properties is expensive. In addition, this configuration cannot prevent deterioration of quantum dots caused by infiltration of oxygen from an end surface of a wavelength conversion layer.

In addition, as a configuration of the wavelength conversion film, a configuration in which microparticles including quantum dots are dispersed in a binder is also known.

For example, JP5744033B describes a configuration in which microparticles (coated particles) including quantum dots (particles having light emitting properties) are dispersed in a host material and a coating including a resin having low oxygen permeability such as polyvinyl alcohol is provided over outer surfaces of the microparticles. JP5744033B describes a wavelength conversion film in which a wavelength conversion layer is formed using a coating composition that is prepared by dispersing the microparticles in the host material.

In the wavelength conversion layer of the wavelength conversion film, the resin having low oxygen permeability such as polyvinyl alcohol is used as a binder, and the microparticles including quantum dots are dispersed in this binder.

Therefore, in the wavelength conversion film, the binder blocks oxygen, and thus deterioration of quantum dots caused by oxygen can be prevented and infiltration of oxygen from an end surface of the wavelength conversion layer can also be prevented even without using a gas barrier film having high gas barrier properties as a substrate.

SUMMARY OF THE INVENTION

In the wavelength conversion film described in JP5744033B including the wavelength conversion layer in which the microparticles including quantum dots are dispersed in the binder, as a method of reducing the thickness of the wavelength conversion layer, a method of improving the content of the quantum dots in the microparticles and a method of improving the content of the microparticles in the wavelength conversion layer can be considered.

However, in a case where the content of the quantum dots in the microparticles increases, the quantum dots aggregate without being uniformly dispersed in the microparticles. Therefore, the quantum yield decreases, and there may be a case where high-efficiency emission (wavelength conversion) cannot be performed.

On the other hand, in a case where the content of the microparticles in the wavelength conversion layer is improved, the content of the binder that exhibits gas barrier properties in the wavelength conversion layer decreases, and deterioration of the quantum dots caused by oxygen cannot be prevented.

An object of the present invention is to solve the above-described problem of the related art and to provide: a thin wavelength conversion film in which a phosphor such as quantum dots can be uniformly dispersed in microparticles and deterioration of the phosphor caused by oxygen can also be prevented; and a backlight unit including the wavelength conversion film.

In order to achieve the object, according to the present invention, there is provided a wavelength conversion film comprising: a wavelength conversion layer; and a substrate that supports the wavelength conversion layer, in which the wavelength conversion layer includes a binder and microparticles, the microparticles include a phosphor and a matrix, an oxygen permeability coefficient of the binder is 0.01 (cc·mm)/(m$^2$·day·atm) or lower, an oxygen permeability coefficient of the matrix is 10 to 1000 (cc·mm)/(m$^2$·day·atm), and a content of the microparticles in the wavelength conversion layer is 3 to 30 vol %.

In the wavelength conversion film according to the present invention, it is preferable that the wavelength conversion layer includes 0.01 to 5 mass % of an emulsifier.

In addition, it is preferable that a HLB value of the emulsifier expressed by the following expression is 8 to 18.

HLB value=20×(the sum of formula weights of hydrophilic groups/molecular weight)

In addition, it is preferable that an internal haze is 50% or higher.

In addition, it is preferable that a thickness of the wavelength conversion layer is 10 to 100 μm In addition, it is preferable that an average particle size of the microparticles is 0.5 to 20 μm.

In addition, it is preferable that the substrate is provided on one main surface of the wavelength conversion layer or the wavelength conversion layer is sandwiched between two substrates, and it is preferable that an oxygen permeability of the substrate is 0.1 to 100 cc/(m²·day·atm).

Further, it is preferable that two or more wavelength conversion layers are provided, and it is preferable that emission wavelengths of phosphors included in the wavelength conversion layers are different from each other.

In addition, according to the present invention, there is provided a backlight unit comprising: the wavelength conversion film according to the present invention; and a light source that emits excitation light exciting the phosphor included in the wavelength conversion layer of the wavelength conversion film.

According to the present invention, it is possible to provide: a thin wavelength conversion film in which a phosphor such as quantum dots can be uniformly dispersed in microparticles and deterioration of the phosphor caused by oxygen can also be prevented; and a highly durable backlight unit including the wavelength conversion film.

DESCRIPTION OF THE PREFERRED EMBODIMENTS

Hereinafter, a wavelength conversion film and a backlight unit according to the present invention will be described in detail based on a preferable embodiment illustrated in the accompanying drawings.

The following description regarding components has been made based on a representative embodiment of the present invention. However, the present invention is not limited to the embodiment.

In this specification, numerical ranges represented by "to" include numerical values before and after "to" as lower limit values and upper limit values.

In addition, in this specification, "(meth)acrylate" represents at least one or any one of acrylate or methacrylate. The same shall be applied to "(meth)acryloyl" or the like.

Figure 1:
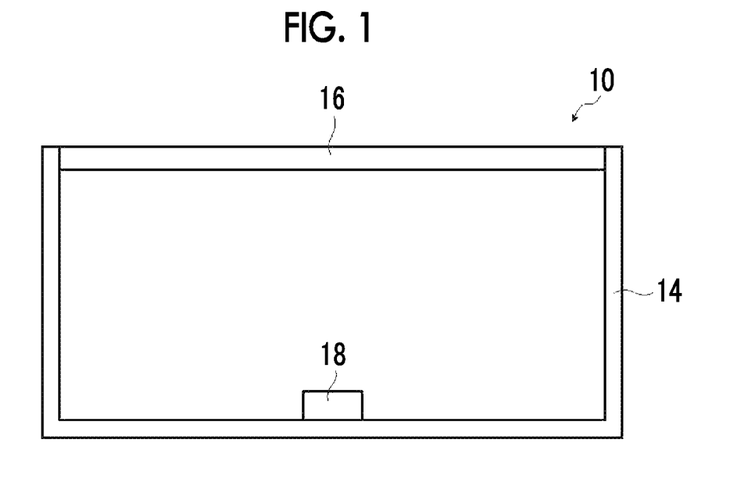
FIG. 1 is a diagram conceptually illustrating an example of a backlight unit according to an embodiment of the present invention.

FIG. 1 conceptually illustrates an example of the backlight unit according to the embodiment of the present invention including the wavelength conversion film according to the embodiment of the present invention.

A backlight unit 10 is a direct type planar backlight unit (planar lighting device) used as, for example, a backlight of a liquid crystal display device and includes a case 14, a wavelength conversion film 16, and a light source 18. The wavelength conversion film 16 is the wavelength conversion film according to the embodiment of the present invention.

In the following description, "liquid crystal display device" will also be referred to as "LCD". "LCD" is an abbreviation for "Liquid Crystal Display".

In addition, FIG. 1 is merely a schematic diagram. In addition to the members illustrated in the drawing, the backlight unit 10 may include various one or more well-known members such as a light emitting diode (LED) substrate, a wiring, or a heat release mechanism that are provided in a well-known backlight unit such as a backlight of an LCD.

The case 14 is, for example, a rectangular case with a maximum surface opened, and the wavelength conversion film 16 is disposed so as to cover the open surface. The case 14 is a well-known case that is used in, for example, a backlight unit of an LCD.

In addition, in a preferable aspect, in the case 14, at least a bottom surface as a surface where the light source 18 is provided is a light reflecting surface selected from a mirror surface, a metal reflecting surface, a diffuse reflecting surface, or the like. It is preferable that the entire area of an inner surface of the case 14 is a light reflecting surface.

The wavelength conversion film 16 is a wavelength conversion film that converts a wavelength of incidence light emitted from the light source 18 and emits the light having the converted wavelength. As described above, the wavelength conversion film 16 is the wavelength conversion film according to the embodiment of the present invention.

Figure 2:
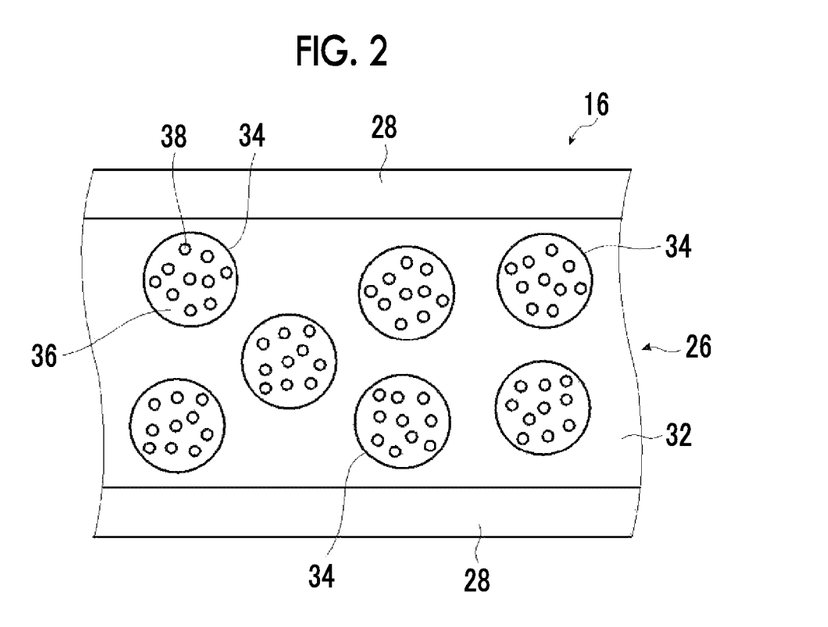
FIG. 2 is a diagram conceptually illustrating an example of a wavelength conversion film according to the present invention.

FIG. 2 conceptually illustrates a configuration of the wavelength conversion film 16. The wavelength conversion film 16 includes a wavelength conversion layer 26 and substrates 28 between which the wavelength conversion layer 26 is sandwiched and supported.

In addition, the wavelength conversion layer 26 includes: a binder 32; and microparticles 34 that are dispersed in the binder 32. The microparticle 34 is a particle including a phosphor in the present invention, in which a phosphor 38 is dispersed in a matrix 36.

The wavelength conversion layer 26 has a function of converting a wavelength of incidence light and emitting the light having the converted wavelength. For example, in a case where blue light emitted from the light source 18 is incident on the wavelength conversion layer 26, the wavelength conversion layer 26 converts a wavelength of at least a part of the blue light into a wavelength of red light or green light due to the effect of the phosphor 38 included in the wavelength conversion layer 26 and emits the light having the converted wavelength.

Here, the blue light is light having a center emission wavelength in a wavelength range of 400 to 500 nm. The green light is light having a center emission wavelength in a wavelength range of longer than 500 nm and 600 nm or shorter. The red light is light having a center emission wavelength in a wavelength range of longer than 600 nm and 680 nm or shorter.

The wavelength conversion function that is exhibited by the wavelength conversion layer is not limited to the configuration of converting a wavelength of blue light into a wavelength of red light or green light as long as it converts a wavelength of at least a part of incidence light into another wavelength of light.

The phosphor (phosphor particles) 38 is excited by at least incident excitation light to emit fluorescence.

In the wavelength conversion film according to the embodiment of the present invention, the kind of the phosphor 38 is not particularly limited, and various well-known phosphors can be appropriately selected according to the required wavelength conversion performance or the like.

Examples of the phosphor 38 include an organic fluorescent dye, an organic fluorescent pigment, a phosphor in which a phosphate, an aluminate, a metal oxide, or the like is doped with a rare earth ion, a phosphor in which a semiconductor material such as a metal sulfide or a metal nitride is doped with an activating ion, and a phosphor utilizing a quantum confinement effect that is known as quantum dots. Among these, quantum dots that can realize a light source having a narrow emission spectral width and having excellent color reproducibility for use in a display and has an excellent emission quantum efficiency are preferably used as the phosphor 38.

That is, in the present invention, as the wavelength conversion layer 26, a wavelength conversion layer in which the microparticles 34 including quantum dots as the phosphor 38 are dispersed in the binder 32, that is, a quantum dot layer is preferably used.

The details of the quantum dots can be found in, for example, paragraphs "0060" to "0066" of JP2012-169271A, but the present invention is not limited thereto. In addition, as the quantum dots, a commercially available product can be used without any particular limitation. The emission wavelength of the quantum dots can be typically adjusted by adjusting the composition of particles and the size of particles.

It is preferable that the quantum dots are dispersed uniformly in the microparticles 34. However, the quantum dots may be unevenly dispersed in the microparticles 34. In addition, as the quantum dots, one kind may be used alone, or two or more kinds may be used in combination. In a case where two or more quantum dots are used in combination, two or more kinds of quantum dots having different emission wavelengths may be used.

This point can be applied even in a case where a phosphor other than the quantum dots is used as the phosphor 38.

Specifically, examples of well-known quantum dots include quantum dots (A) having a center emission wavelength in a wavelength range of longer than 600 nm and 680 nm or shorter, quantum dots (B) having a center emission wavelength in a wavelength range of longer than 500 nm and 600 nm or shorter, and quantum dots (C) having a center emission wavelength in a wavelength range of 400 to 500 nm. The quantum dots (A) are excited by the excitation light to emit red light, the quantum dots (B) are excited by the excitation light to emit green light, and the quantum dots (C) are excited by the excitation light to emit blue light.

For example, in a case where blue light is incident as excitation light on the quantum dot layer including the quantum dots (A) and the quantum dots (B), white light can be realized by red light emitted from the quantum dots (A), green light emitted from the quantum dots (B), and blue light having passed through the quantum dot layer. In addition, in a case where ultraviolet light is incident as excitation light on the quantum dot layer including the quantum dots (A), (B), and (C), white light can be realized by red light emitted from the quantum dots (A), green light emitted from the quantum dots (B), and blue light emitted from the quantum dots (C).

In addition, as the quantum dots, for example, so-called quantum rods or tetrapod type quantum dots that have a rod shape and emit polarized light having directivity may be used.

As a described above, in the wavelength conversion layer 26 of the wavelength conversion film 16, the microparticles 34 in which the phosphor 38 is dispersed in the matrix 36 are dispersed in the binder 32 and are fixed.

Here, in the wavelength conversion film 16 according to the embodiment of the present invention, an oxygen permeability coefficient of the matrix 36 that is a material for forming the microparticles 34 and in which the phosphor 38 is dispersed is 10 to 1000 $(cc \cdot mm)/(m^2 \cdot day \cdot atm)$, and an oxygen permeability coefficient of the binder 32 in which the microparticles 34 are dispersed is 0.01 $(cc \cdot mm)/(m^2 \cdot day \cdot atm)$ or lower.

Further, in the wavelength conversion film 16 according to the embodiment of the present invention, the content of the microparticles 34 in the wavelength conversion layer 26 is 3 to 30 vol %.

Due to the above-described configuration, the wavelength conversion film 16 according to the embodiment of the present invention can be made thin, the phosphor 38 such as quantum dots can be uniformly dispersed in the microparticles 34, and deterioration of the phosphor 38 caused by oxygen can be prevented.

As described in JP5744033B, a wavelength conversion film in which microparticles including a phosphor such as quantum dots are dispersed in a binder is known.

Regarding the wavelength conversion film including the microparticles, in the wavelength conversion layer in which the microparticles including a phosphor are dispersed in the binder, a resin is generally used as the matrix and the binder for forming the microparticles. Accordingly, deterioration of the phosphor caused by oxygen can be prevented by using a resin having high gas barrier properties (oxygen barrier properties) such as polyvinyl alcohol as the binder.

On the other hand, as a method of reducing the thickness of the wavelength conversion film that includes the microparticles including the phosphor, a method of increasing the content of the phosphor included in the microparticles and a method of increasing the content of the microparticles in the wavelength conversion layer can be considered.

In the wavelength conversion layer including the microparticles, in order to obtain a high quantum yield, it is necessary that the phosphor is appropriately dispersed without aggregation in the microparticles even in a case where content of the phosphor to be included is increased.

In addition, in order to more suitably prevent deterioration of the phosphor caused by oxygen, it is preferable that a material having high gas barrier properties is used as the matrix for forming the microparticles including the phosphor.

Here, in general, the phosphor having a high emission efficiency, for example, quantum dots are hydrophobic. Accordingly, in the microparticles, in order to hold a sufficient amount of the phosphor in the matrix in a state where it is appropriately dispersed without aggregation, it is preferable that a hydrophobic material is used as the matrix.

However, the hydrophobic material has high compatibility with oxygen. Therefore, as the hydrophobicity increases, the oxygen permeability coefficient increases, that is, the gas barrier properties decrease. Conversely, as the hydrophilicity increases, the oxygen permeability coefficient of the material decreases, that is, the gas barrier properties increase. That is, the material for forming the matrix has a trade-off relationship between the dispersibility of the phosphor and the gas barrier properties.

On the other hand, in a case where the microparticles in which the hydrophobic matrix is formed is used, the content of the microparticles in the wavelength conversion layer increases, and it is preferable that a hydrophilic material is used as the binder in order to appropriately disperse the microparticles including the phosphor in the binder.

As described above, the hydrophilicity of the material increases, the oxygen permeability coefficient decreases, that is, the gas barrier properties increases. However, in a case where the microparticles are formed of a hydrophobic material, that is, a material having low gas barrier properties, when the content of the microparticles is high, the gas barrier properties of the wavelength conversion layer deteriorate, and deterioration of the phosphor caused by oxygen cannot be prevented.

The present invention has been made based on the above-described finding. As described above, the material having appropriate hydrophobicity (lipophilicity) in which the oxygen permeability coefficient is 10 to 1000 (cc·mm)/(m$^2$·day·atm) is used as the matrix 36 that is the material for forming the microparticles 34, the material having high hydrophilicity in which the oxygen permeability coefficient is 0.01 (cc·mm)/(m$^2$·day·atm) or lower is used as the binder 32 in which the microparticles 34 are to be dispersed, and the content of the microparticles 34 in the wavelength conversion layer 26 is 3 to 30 vol %.

As a result, a sufficient amount of the phosphor 38 is included in the microparticles 34 without aggregation and a sufficient amount of the microparticles 34 are appropriately dispersed in the binder 32 such that the thickness of the wavelength conversion layer 26, that is, the wavelength conversion film 16 can be reduced, excellent optical characteristics are secured, and deterioration of the phosphor 38 such as quantum dots caused by oxygen is also prevented, thereby realizing the wavelength conversion film 16 having high durability.

Accordingly, the backlight unit 10 according to the embodiment of the present invention including the wavelength conversion film 16 according to the embodiment of the present invention is thin, has excellent optical characteristics capable of high-luminance and uniform planar illumination, and has also excellent durability.

In the wavelength conversion film 16 according to the embodiment of the present invention, the oxygen permeability coefficient of the matrix 36 that is the material for forming the microparticles 34 is 10 to 1000 (cc·mm)/(m$^2$·day·atm).

In a case where the oxygen permeability coefficient of the matrix 36 is lower than 10 (cc·mm)/(m$^2$·day·atm), there are problems in that, for example, a sufficient amount of the phosphor 38 cannot be appropriately dispersed and held in the matrix 36, that is, the microparticles 34 without aggregation or the luminance of the wavelength conversion layer 26 decreases due to the aggregation of the phosphor 38.

In a case where the oxygen permeability coefficient of the matrix 36 is higher than 1000 (cc·mm)/(m$^2$·day·atm), there are problems in that, for example, the gas barrier properties of the wavelength conversion film 16 are low such that the reliability of the phosphor 38 is likely to deteriorate due to oxygen.

The oxygen permeability coefficient of the matrix 36 is preferably 10 to 500 (cc·mm)/(m$^2$·day·atm).

The SI unit of the oxygen permeability coefficient is "fm·mm/(s·Pa)". "fm" refers to "femtometer," and "1 fm=1×10$^{-15}$ m". Regarding the conversion between "fm·mm/(s·Pa)" as the SI unit and "cc·mm/(m$^2$·day·atm)", "1 fm·mm/(s·Pa)=8.752 cc·mm/(m$^2$·day·atm)".

In addition, for example, the oxygen permeability coefficient and the oxygen permeability can be measured using, for example, a method described in JIS K 7126 (isopiestic method) and ASTM D3985, and the measurement is performed using a an oxygen permeability measuring device (manufactured by Mocon Inc.) or a measuring device (for example, manufactured by Nippon API Co., Ltd.) according to atmospheric pressure ionization mass spectrometry (APIMS) under conditions of temperature: 25° C. and relative humidity: 60% RH.

As the material for forming the matrix 36 of the microparticles 34, various well-known materials can be used as long as the oxygen permeability coefficient thereof is 10 to 1000 (cc·mm)/(m$^2$·day·atm). As the material for forming the matrix 36, various resins can be preferably used.

For example, the matrix 36 can be formed by curing (polymerization and crosslinking) a monofunctional (meth)acrylate monomer and/or a polyfunctional (meth)acrylate monomer.

As the monofunctional (meth)acrylate monomer, for example, acrylic acid, methacrylic acid, or a derivative thereof can be used. More specifically, an aliphatic or aromatic monomer having one polymerizable unsaturated bond (meth)acryloyl group of (meth)acrylic acid in the molecule and having 1 to 30 carbon atoms in the alkyl group can be used. Hereinafter, specific examples of the monofunctional (meth)acrylate monomer include the following compounds, but the present invention is not limited thereto.

Examples of the aliphatic monofunctional (meth)acrylate monomer include:

an alkyl (meth)acrylate with an alkyl group having 1 to 30 carbon atoms such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, or stearyl (meth)acrylate;

an alkoxyalkyl (meth)acrylate with an alkoxyalkyl group having 2 to 30 carbon atoms such as butoxyethyl (meth)acrylate;

an aminoalkyl (meth)acrylate with a (monoalkyl or dialkyl)aminoalkyl group having 1 to 20 carbon atoms in total such as N,N-dimethylaminoethyl (meth)acrylate;

a polyalkylene glycol alkyl ether (meth)acrylate with an alkylene chain having 1 to 10 carbon atoms and a terminal alkyl ether having 1 to 10 carbon atoms such as diethylene glycol ethyl ether (meth)acrylate, triethylene glycol butyl ether (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol monomethyl ether (meth)acrylate, dipropylene glycol monomethyl ether (meth)acrylate, heptapropylene glycol monomethyl ether (meth)acrylate, or tetraethylene glycol monoethyl ether (meth)acrylate;

a polyalkylene glycol aryl ether (meth)acrylate with an alkylene chain having 1 to 30 carbon atoms and a terminal aryl ether having 6 to 20 carbon atoms such as hexaethylene glycol phenyl ether (meth)acrylate;

a (meth)acrylate having an alicyclic structure and having 4 to 30 carbon atoms in total such as cyclohexyl (meth)acrylate, dicyclopentanyl (meth)acrylate, isobornyl (meth)acrylate, or a methylene oxide adduct of cyclodecatriene (meth)acrylate;

a fluorinated alkyl(meth)acrylate having 4 to 30 carbon atoms in total such as heptadecafluorodecyl (meth)acrylate;

a (meth)acrylate having a hydroxyl group such as 2-hydroxyethyl (meth)acrylate, 3-hydroxypropyl (meth)acrylate, 4-hydroxybutyl (meth)acrylate, triethylene glycol mono (meth)acrylate, tetraethylene glycol mono(meth)acrylate, hexaethylene glycol mono(meth)acrylate, octapropylene glycol mono(meth)acrylate, or glycerol mono(meth)acrylate;

a (meth)acrylate having a glycidyl group such as glycidyl (meth)acrylate;

a polyethylene glycol mono(meth)acrylate with an alkylene chain having 1 to 30 carbon atoms such as tetraethylene glycol mono(meth)acrylate, hexaethylene glycol mono(meth)acrylate, or octapropylene glycol mono(meth)acrylate; and a (meth)acrylamide such as (meth)acrylamide, N,N-dimethyl (meth)acrylamide, N-isopropyl (meth)acrylamide, 2-hydroxyethyl (meth)acrylamide, or acryloylmorpholine.

As the aromatic monofunctional acrylate monomer, an aralkyl (meth)acrylate having 7 to 20 carbon atoms in the aralkyl group, for example, benzyl (meth)acrylate can be used.

In particular, an aliphatic or aromatic alkyl (meth)acrylate having 4 to 30 carbon atoms in the alkyl group is preferable, and n-octyl (meth)acrylate, lauryl (meth)acrylate, stearyl (meth)acrylate, cyclohexyl (meth)acrylate, dicyclopentanyl (meth)acrylate, isobornyl (meth)acrylate, or a methylene oxide adduct of cyclodecatriene (meth)acrylate is more preferable.

As a result, the dispersibility of the phosphor 38 such as quantum dots in the microparticles 34 is improved. As the dispersibility of the phosphor 38 is improved, the amount of light directed from the wavelength conversion layer 26 to an emission surface increases, which is efficient for improving front luminance and front contrast.

In addition, preferable examples of the bifunctional (meth)acrylate monomer among the bifunctional or higher polyfunctional (meth)acrylate monomers include neopentyl glycol di(meth)acrylate, 1,6-hexanediol di(meth)acrylate, 1,9-nonanediol di(meth)acrylate, 1,10-decanediol diacrylate, tripropylene glycol di(meth)acrylate, ethylene glycol di(meth)acrylate, tetraethylene glycol di(meth)acrylate, hydroxypivalic acid neopentyl glycol di(meth)acrylate, polyethylene glycol di(meth)acrylate, tricyclodecane dimethanol diacrylate, and ethoxylated bisphenol A diacrylate.

In addition, preferable examples of a trifunctional (meth) acrylate monomer among the bifunctional or higher (meth) acrylate monomers include epichlorohydrin (ECH)-modified glycerol tri(meth)acrylate; ethylene oxide (EO)-modified glycerol tri(meth)acrylate, propylene oxide (PO)-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri (meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxy penta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxy tetra(meth)acrylate, and pentaerythritol tetra(meth)acrylate.

In addition, as the polyfunctional monomer, a (meth) acrylate monomer having a urethane bond in the molecule, specifically, an adduct of tolylene diisocyanate (TDI) and hydroxyethyl acrylate, an adduct of isophorone diisocyanate (IPDI) and hydroxyethyl acrylate, an adduct of hexamethylene diisocyanate (HDI) and pentaerythritol triacrylate (PETA), a compound obtained by a reaction of residual isocyanate, which remains after preparation of an adduct of TDI and PETA, and dodecyloxyhydroxypropyl acrylate, an adduct of nylon 6,6 and TDI, or an adduct of pentaerythritol, TDI, and hydroxyethyl acrylate can also be used.

Plural kinds selected from the above (meth)acrylate monomers may be used in combination.

Further, a commercially available product can be used as the (meth)acrylate monomer.

In addition, in the present invention, as the matrix 36 for forming the microparticle 34, a cured product of a silicone resin such as polydimethylsiloxane or polyorganosilsesquioxane other than the cured product of the (meth)acrylate monomer can also be preferably used.

In addition, in addition to the matrix 36 and the phosphor 38, the microparticles 34 may optionally include a polymerization initiator, a viscosity adjuster, a thixotropic agent, a hindered amine compound, an antioxidant, a light scattering agent, a polymer dispersant, or a surfactant.

For example, by the microparticles 34 including a hindered amine compound, coloration of the microparticles 34 caused by high-illuminance light can be suppressed.

Although described below, the microparticles 34 are formed using a method including: adding and dispersing the phosphor 38 to and in a liquid compound for forming the matrix 36 such as the (meth)acrylate monomer to prepare a dispersion; putting this dispersion into an aqueous solution in which a compound for forming the binder 32 such as polyvinyl alcohol described below is dissolved; and curing the compound for forming the matrix 36 of the dispersion under stirring.

That is, "the microparticles 34 may include a polymerization initiator" represents that the dispersion for forming the microparticles 34 may optionally include a polymerization initiator in other words.

The particle size of the microparticles 34 is not particularly limited and may be appropriately set according to the thickness of the wavelength conversion layer 26, the content of the microparticles 34 in the wavelength conversion layer 26, and the like. For example, the average particle size is preferably 0.5 to 20 μm to and more preferably 1 to 15 nm.

The average particle size of the microparticles 34 is preferably 0.5 μm or more from the viewpoint that, for example, the microparticles 34 can be dispersed in the binder 32 without aggregation.

The average particle size of the microparticles 34 is preferably 20 μm or less from the viewpoints that, for example, the thickness of the wavelength conversion layer 26 can be reduced, precipitation of the microparticles 34 in a coating solution described below can be suppressed, and the pot life of the coating solution or the like can be increased.

The particle size of a microparticle refers to the maximum length of the microparticle, that is, the diameter of a circle inscribed in the microparticle.

The content of the phosphor 38 in the microparticles 34 is not particularly limited and may be appropriately set according to the kind of the phosphor 38 to be used, the particle size of the microparticles 34, and the like. For example, the content of the phosphor is preferably 0.01 to 20 mass %, more preferably 0.1 to 20 mass %, and still more preferably 0.1 to 10 mass %.

The content of the phosphor 38 in the microparticles 34 is preferably 0.01 mass % or higher from the viewpoints that, for example, a sufficient amount of the phosphor 38 can be held to realize high-luminance emission, sufficient luminance can be obtained without unnecessarily increasing the thickness of the wavelength conversion layer 26, and the thickness of the wavelength conversion film 16 can be reduced.

The content of the phosphor 38 in the microparticles 34 is preferably 20 mass % or lower from the viewpoints that, for example, the phosphor 38 can be suitably dispersed in the microparticles 34 without aggregation to realize high-luminance emission with a high quantum yield, light loss caused by self-absorption, reabsorption, and the like of the phosphor 38 can be suppressed.

The binder 32 of the wavelength conversion layer 26 can hold the microparticles 34 including the phosphor 38 to be formed in the matrix 36 in the dispersed state As described above, the oxygen permeability coefficient of the binder 32 is 0.01 (cc·mm)/(m$^2$·day·atm) or lower.

In a case where the oxygen permeability coefficient of the binder 32 is higher than 0.01 (cc·mm)/(m$^2$·day·atm), there is a problem in that, for example, deterioration of the phosphor 38 caused by oxygen cannot be prevented.

The oxygen permeability coefficient of the binder 32 is preferably 0.005 (cc·mm)/(m$^2$·day·atm) or lower.

The oxygen permeability coefficient of the binder 32 is preferably as low as possible. Accordingly, the lower limit of the oxygen permeability coefficient of the binder 32 is not particularly limited.

The material for forming the binder 32 is not particularly limited, and various well-known materials can be used as long as they have an oxygen permeability coefficient of 0.01 (cc·mm)/(m$^2$·day·atm) or lower and can hold and fix the microparticles 34. Preferably, various resins can be used.

Specific examples of the material for forming the binder 32 include polyvinyl alcohol (PVA), modified PVA having a substituent such as a vinyl group or a (meth)acryloyl group, an ethylene-vinyl alcohol copolymer (EVOH), a butenediol-vinyl alcohol copolymer (BVOH), polyvinylidene chloride, and aromatic polyamide (aramid).

Among these, PVA or modified PVA is preferable from the viewpoint that the oxygen permeability coefficient is low and liquid stability over time is excellent.

The modifying group of the modified PVA can be introduced by copolymerization modification, chain transfer modification, or block polymerization modification. Examples of the modifying group include a hydrophilic group (for example, a carboxylate group, a sulfonate group, a phosphonate group, an amino group, an ammonium group, an amido group, or a thiol group), a hydrocarbon group having 10 to 100 carbon atoms, a fluorine-substituted hydrocarbon group, a thioether group, a polymerizable group (for example, an unsaturated polymerizable group, an epoxy group, or an aziridinyl group), and an alkoxysilyl group (trialkoxy, dialkoxy, or monoalkoxy). Specific examples of the modified PVA include examples described in paragraph "0074" of JP2000-056310A, paragraphs "0022" to "0145" of JP2000-155216A, and paragraphs "0018" to "0022" of JP2002-062426A.

As the binder 32, two or more kinds may be used in combination. In addition, as the binder 32, a commercially available product may be used.

As described above, in the wavelength conversion film according to the embodiment of the present invention, the content of the microparticles 34 in the wavelength conversion layer 26 is 3 to 30 vol %.

In a case where the content of the microparticles 34 in the wavelength conversion layer 26 is lower than 3 vol %, there are problems in that, for example, light having a sufficient luminance cannot be emitted and the thickness of the wavelength conversion layer 26, that is, the wavelength conversion film 16 cannot be reduced.

In a case where the content of the microparticles 34 in the wavelength conversion layer 26 is higher than 30 vol %, there are problems in that, for example, deterioration of the phosphor 38 caused by oxygen cannot be prevented and the microparticles 34 cannot be appropriately dispersed in the wavelength conversion layer 26.

The content of the microparticles 34 in the wavelength conversion layer 26 is preferably 5 to 25 vol %.

The content of the microparticles 34 in the wavelength conversion layer 26 may be measured using a method including: cutting the wavelength conversion layer 26 with a microtome or the like to form a cross-section; observing the cross-section with an optical microscope to obtain an image; and analyzing the obtained image.

The binder 32 of the wavelength conversion layer 26 may further include an emulsifier. The content of the emulsifier in the binder 32 is preferably 0.01 to 5 mass % and more preferably 0.05 to 3 mass %.

It is preferable that the binder 32 includes the emulsifier and it is more preferable that the content of the emulsifier in the binder 32 is 0.01 mass % or higher from the viewpoints that, for example, the dispersed state of the microparticles 34 in the wavelength conversion layer 26 can be improved such that the wavelength conversion film 16 having excellent optical characteristics in which light chromaticity unevenness and luminance unevenness is reduced can be obtained and the particle size distribution of the microparticles 34 can be made to be sharp.

In a case where the binder 32 includes the emulsifier, it is preferable that the content of the emulsifier is 5 mass % or lower from the viewpoint that, for example, deterioration in the gas bather properties of the wavelength conversion layer 26 can be prevented.

The emulsifier added to the wavelength conversion layer 26 is not particularly limited, and various well-known emulsifiers can be used. Preferably, an emulsifier having an HLB value (Hydrophile-Lipophile Balance Value) is 8 to 18 is used. As the emulsifier added to the wavelength conversion layer 26, an emulsifier having an HLB value of 10 to 16 is more preferable. The HLB value may be calculated using a well-known method, and examples of the method include a Griffin method and a Davies' method. In the present invention, a value calculated using a Griffin method is used. The HLB value calculated using a Griffin method is obtained from the following Expression based on formula weights of hydrophilic groups and a molecular weight. Accordingly, in this case, the HLB value is in a range of 0 to 20.

$$\text{HLB value} = 20 \times (\text{the sum of formula weights of hydrophilic groups/molecular weight})$$

Examples of the emulsifier include a cationic surfactant, an anionic surfactant, and a nonionic surfactant. In the present invention, an anionic surfactant or a nonionic surfactant is preferable from the viewpoint of not inhibiting the dispersibility of the phosphor. As the anionic surfactant used in the present invention, specifically, an alkyl sulfate is preferably used from the viewpoint that it has little odor has excellent biodegradability, and is relatively eco-friendly. Specific examples of the alkyl sulfate include sodium octylsulfate (SOS; having 8 carbon atoms), sodium decylsulfate (having 10 carbon atoms), and sodium dodecylsulfate (SDS; having 12 carbon atoms). In addition, examples of the nonionic surfactant include: an ether such as polyethylene glycol dodecyl ether, polyethylene glycol octadecyl ether, polyethylene glycol oleyl ether, polyoxyethylene nonyl phenyl ether, polyoxyethylene octyl phenyl ether, polyoxyethylene dodecyl phenyl ether, polyoxyethylene oleyl ether, polyoxyethylene lauryl ether, or polyoxyethylene alkyl ether; an ester such as polyoxyethylene oleyl acid ester, polyoxyethylene distearic acid ester, sorbitan laurate, sorbitan monostearate, sorbitan monooleate, sorbitan sesquioleate, polyoxyethylene monooleate, or polyoxyethylene stearate; an acetylene alcohol such as 3,5-dimethyl-1-hexyn-3-ol; and an acetylenic glycol such as 2,4,7,9-tetramethyl-5-decyne-4,7-diol or 3,6-dimethyl-4-octyne-3,6-diol.

In addition, as the nonionic surfactant, a commercially available product such as BRIJ 30, BRIJ S10, BRIJ 020, or BRIJ 93 (all of which are manufactured by Sigma-Aldrich Co., Llc.) can also be suitably used.

In addition to the emulsifier, the wavelength conversion layer 26 may optionally include a silane coupling agent, a crosslinking agent, a light scattering agent, a viscosity adjuster, a surface adjuster, or an inorganic layer compound.

Although described below, the wavelength conversion layer 26 can be formed using a method including: preparing the dispersion for forming the microparticles 34; putting this dispersion into an aqueous solution in which a compound for forming the binder 32 such as PVA is dissolved; curing the matrix 36 under stirring to prepare a coating solution in which the microparticles 34 are dispersed and emulsified in the aqueous solution; applying the coating solution to the substrate 28 described below; and drying the applied coating solution.

That is, "the wavelength conversion layer 26 may include an emulsifier" represents that the coating solution for forming the wavelength conversion layer 26 may optionally include an emulsifier in other words.

The wavelength conversion layer 26 may have a single-layer configuration or may have a multiplayer configuration including two or more layers.

In a case where the wavelength conversion layer 26 has a multiplayer configuration, it is preferable that emission wavelengths of phosphors included in the wavelength conversion layers are different from each other. Examples of a two-layer configuration include a configuration in which one layer includes the above-described quantum dots (A) that are excited by excitation light (blue light) to emit red light and another layer includes the above-described quantum dots (B) that are excited by excitation light (blue light) to emit green light.

This way, in a case where the wavelength conversion layer 26 has a multiplayer configuration, it is preferable that emission wavelengths of phosphors included in the wavelength conversion layers are different from each other from the viewpoints that, for example, deterioration of dispersibility in the matrix caused by ligand exchange during mixing of the quantum dots (A) and (B) can be prevented, deterioration in luminance caused by emission reabsorption between the quantum dots (A) and (B) can be suppressed, and white spots of the obtained wavelength conversion layer can be easily adjusted as desired.

The thickness of the wavelength conversion layer 26 is not particularly limited and may be appropriately set according to the thickness of the wavelength conversion film 16, the phosphor 38 to be used, the binder 32 to be used, and the like.

The thickness of the wavelength conversion layer 26 is preferably 10 to 100 μm and more preferably 15 to 90 μm.

It is preferable that the thickness of the wavelength conversion layer 26 is 10 μm or more from the viewpoints that, for example, the wavelength conversion layer 26 that emits light with a sufficient luminance can be obtained and a tint distribution and a luminance distribution generated by a thickness distribution of the wavelength conversion layer 26 can be improved.

It is preferable that the thickness of the wavelength conversion layer 26 is 100 μm or less from the viewpoint that, for example, an unnecessary increase in the thickness of the wavelength conversion film 16 can be prevented.

As the substrate 28, various film-like materials (sheet-like materials) that are used for a well-known wavelength conversion film can be used. Accordingly, as the substrate 28, various film-like materials that can support the wavelength conversion layer 26 and the coating solution for forming the wavelength conversion layer 26 can be used.

Here, the substrate 28 is preferably transparent. For example, glass, a transparent inorganic crystalline material, or a transparent resin material can be used. In addition, the substrate 28 may be a rigid sheet-like material or a flexible film-like material. Further, the substrate 28 may have an elongated material that can be wound or a cut sheet material having a predetermined dimension.

As the substrate 28, films formed of various resin materials (polymer materials) can be suitably used from the viewpoints that, for example, a reduction in thickness is easy, a reduction in weight is easy, and the flexibility is high.

Preferable examples of the films include resin films formed of polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), transparent polyimide, polymethyl methacrylate resin (PMMA), polycarbonate (PC), polyacrylate, polymethacrylate, polypropylene (PP), polystyrene (PS), ABS, a cycloolefin copolymer (COC), a cycloolefin polymer (COP), and triacetyl cellulose (TAC).

In addition, a gas barrier film in which a gas barrier layer exhibiting gas barrier properties is formed on the resin film can also be used as the substrate 28.

Here, the oxygen permeability of the substrate 28 is preferably 0.1 to 100 $cc/(m^2 \cdot day \cdot atm)$ and more preferably 1 to 50 $cc/(m^2 \cdot day \cdot atm)$.

The SI unit of the oxygen permeability is "$fm/(s \cdot Pa)$". "$cc/(m^2 \cdot day \cdot atm)$" can be converted into SI unit based on "1 $fm/(s \cdot Pa) = 8.752 \ cc/(m^2 \cdot day \cdot atm)$".

It is preferable that the oxygen permeability of the substrate 28 is 100 $cc/(m^2 \cdot day \cdot atm)$ or lower from the viewpoints that, for example, deterioration of the phosphor 38 caused by oxygen can be prevented and deterioration of the binder 32 can be prevented.

In addition, the film having a low oxygen permeability, that is, the film having high gas barrier properties is a film a dense film having a high density or a film including a dense layer having a high density, and general examples thereof include a film as a support on which a layer formed of a metal oxide or a metal nitride having a thickness of several tens to several hundreds of nanometers is formed. However, the film including an inorganic matter may deteriorate the optical characteristics of the wavelength conversion film 16 due to light absorption of the inorganic layer or the like. In addition, a method such as chemical vapor deposition (CVD) or physical vapor deposition (PVD) is used to form the inorganic layer. However, this method is generally expensive because the production rate is low and the quality control level of foreign matter or the like is extremely high. On the other hand, by adjusting the oxygen permeability of the substrate 28 to be 0.1 cc/(m$^2$·day·atm) or higher, a film or the like that is prepared through a wet process such as solution coating or a spray coating method can be selected, and it is not necessary to provide a dense inorganic layer. Therefore, it is preferable that the oxygen permeability of the substrate 28 to be 0.1 cc/(m$^2$·day·atm) or higher from the viewpoints that, for example, deterioration in the optical characteristics of the wavelength conversion film 16 caused by the substrate 28 can be prevented and the costs of the wavelength conversion film 16 can be reduced.

The wavelength conversion film 16 illustrated in FIG. 2 has the configuration in which the wavelength conversion layer 26 is sandwiched between the substrates 28 corresponding to opposite main surfaces of the wavelength conversion layer 26. However, the present invention is not limited to the configuration. That is, the wavelength conversion film 16 according to the embodiment of the present invention may have a configuration in which the substrate 28 is provided only on one main surface of the wavelength conversion layer 26. The main surface refers to a maximum surface of a layer, a film-like material, or the like.

However, it is preferable that the wavelength conversion film 16 according to the embodiment of the present invention has the configuration in which the wavelength conversion layer 26 is sandwiched between the substrates 28 from the viewpoints that, for example, the wavelength conversion layer 26 can be suitably protected, deterioration of the phosphor 38 caused by oxygen can be prevented, and physical modification such as curling or buckling can be suppressed by improving the rigidity of the wavelength conversion film 16.

In a case where the wavelength conversion layer 26 is sandwiched between the substrates 28, the two substrates may be the same as or different from each other.

In a case where the wavelength conversion layer 26 is sandwiched between the substrate 28 and the substrates are different from each other, it is preferable that at least one of the substrates 28 satisfies the above-described oxygen permeability, and it is more preferable that both the substrates 28 satisfy the above-described oxygen permeability.

In addition, the thickness of the substrate 28 is preferably 5 to 150 μm, more preferably 10 to 70 μm, and still more preferably 15 to 55 μm.

It is preferable that the thickness of the substrate 28 is 5 μm or more from the viewpoints that, for example, the wavelength conversion layer 26 can be suitably held and protected, deterioration of the phosphor 38 caused by oxygen can be prevented, and physical modification such as curling or buckling can be suppressed by improving the rigidity of the wavelength conversion film 16.

It is preferable that the thickness of the substrate 28 is 150 μm or less from the viewpoint that, for example, the total thickness of the wavelength conversion film 16 including the wavelength conversion layer 26 can be reduced.

In the wavelength conversion film 16 according to the embodiment of the present invention, the haze is preferably 50% or higher and more preferably 80% or higher.

It is preferable that the haze of the wavelength conversion film 16 is 50% or higher from the viewpoints that, for example, light that is uniform across the entire surface without luminance unevenness and color unevenness can be emitted, the optical path length of light of a light source in the wavelength conversion layer 26 can be increased such that the light absorption amount of the phosphor 38 such as quantum dots is increased, and the costs can be reduced by reducing the amount of the phosphor 38 used.

The haze of the wavelength conversion film 16 may be measured using a commercially available measuring device such as NDH 5000 (manufactured by Nippon Denshoku Industries Co., Ltd.) according to JIS K 7136.

A method of preparing the wavelength conversion film 16 is not particularly limited, and various well-known methods of preparing a laminated film in which a layer that exhibits an optical function is sandwiched between resin films or the like or one surface thereof is supported can be used.

For example, a preferable method of preparing the wavelength conversion film 16 is as follows.

The phosphor 38 such as quantum dots is put into a liquid compound for forming the matrix 36 such as an uncured (meth)acrylate monomer, optionally a polymerization initiator or the like is further put thereinto, and the components are stirred. As a result, a dispersion in which the phosphor 38 is dispersed in the liquid compound for forming the matrix 36 is prepared. The content of phosphor 38 in the dispersion is the content of the phosphor 38 in the microparticles 34 to be formed.

As described above, the oxygen permeability coefficient of the matrix 36 is 10 to 1000 cc/(m$^2$·day·atm). Accordingly the liquid compound for forming the matrix 36 has appropriate hydrophobicity (lipophilicity). Therefore, the hydrophobic phosphor 38 such as quantum dots is suitably dispersed in the liquid compound for forming the matrix 36.

On the other hand, a binder aqueous solution in which the compound for forming the binder 32 such as PVA is dissolved in water is prepared. As the water, pure water or ion exchange water is preferably used.

The concentration of the aqueous solution is not particularly limited, and the compound for forming the binder 32 may be appropriately set according to the amount of the dispersion described below put and the like. The concentration of the aqueous solution is preferably 1 to 40 mass % and more preferably 5 to 20 mass %.

Next, the above-described dispersion is put into the aqueous solution in which the binder 32 is dissolved in water, optionally an emulsifier or the like is further put thereinto, and the components are stirred. As a result, an emulsion in which the dispersion is dispersed and emulsified in the aqueous solution is prepared.

As described above, the liquid compound for forming the matrix 36 is hydrophobic, and the phosphor 38 is also hydrophobic. Further, the oxygen permeability coefficient of the binder 32 is 0.01 cc/(m$^2$·day·atm) or lower. Accordingly, the binder 32 is hydrophilic. Therefore, the dispersion is dispersed in the aqueous solution in a liquid droplet state where the phosphor 38 is included in liquid droplets of the compound for forming the matrix 36. In other words, the emulsion is in a state where the liquid droplets of the compound for forming the matrix 36 including the phosphor 38 are dispersed and emulsified in the aqueous solution.

After the preparation of the emulsion, the compound for forming the matrix 36 in the dispersion is cured (crosslinking and polymerization) using a method such as ultraviolet irradiation or heating while stirring the emulsion.

As a result, the microparticles 34 in which the phosphor 38 is dispersed in the matrix 36 are formed, the microparticles 34 are dispersed and emulsified in the aqueous solution of the binder 32, and thus the coating solution is prepared.

On the other hand, two substrates 28 such as a PET film are prepared.

After the preparation of the coating solution and the preparation of the substrate 28, the coating solution is applied to one surface of one substrate 28, and the applied coating solution is heated and dried. As a result, the wavelength conversion layer 26 is formed.

A method of applying the coating solution is not particularly limited, and various coating methods such as a spin coating method, a die coating method, a bar coating method, or a spray coating method can be used.

In addition, a method of heating and drying the coating solution is not particularly limited, and various well-known methods of drying an aqueous solution such as heating drying using a heater, heating drying using warm air, or heating drying using a heater and warm air in combination can be used.

After the formation of the wavelength conversion layer 26, another substrate 28 is laminated on and bonded to a surface of the wavelength conversion layer 26 where the substrate 28 is not laminated. As a result, the wavelength conversion film 16 illustrated in FIG. 2 is prepared.

The bonding of the substrate 28 may be performed using the viscosity or adhesiveness of the wavelength conversion layer 26 or may be performed by optionally using an adhesive, an adhesive layer, or an adhesive sheet such as a transparent pressure sensitive adhesive, a transparent pressure sensitive adhesive sheet, or an optical clear adhesive (OCA).

In a case where the wavelength conversion film in which the substrate 28 is provided only on one main surface of the wavelength conversion layer 26 is prepared, the manufacturing of the wavelength conversion film may end when the coating solution is heated and dried to form the wavelength conversion layer 26.

In the backlight unit 10, the light source 18 is disposed at a center position of a bottom surface in the case 14. The light source 18 is a light source of light emitted from the backlight unit 10.

As the light source 18, various well-known light sources can be used as long as they emit light having a wavelength that is converted by the phosphor 38 of the wavelength conversion film 16 (the wavelength conversion layer 26) such as quantum dots.

In particular, for example, a light emitting diode (LED) is preferably used as the light source 18. In addition, as the wavelength conversion layer 26 of the wavelength conversion film 16, the quantum dot layer in which quantum dots are dispersed in the matrix such as a resin is preferably used. Therefore, as the light source 18, a blue LED that emits blue light is preferably used, and a blue LED having a peak wavelength of 450 nm±50 nm is more preferably used.

In the backlight unit 10 according to the embodiment of the present invention, the output of the light source 18 is not particularly limited and may be appropriately set according to the illuminance (luminance) of light required for the backlight unit 10.

In addition, in the backlight unit 10 according to the embodiment of the present invention, one light source 18 may be provided as illustrated in the drawing, or a plurality of light sources 18 may be provided.

The backlight unit 10 illustrated in FIG. 1 is a so-called direct type backlight unit, but the present invention is not limited thereto. The present invention is suitably applicable to a so-called edge light type backlight unit used for a light guide plate.

In this case, for example, an edge light type backlight unit may be configured by disposing a light guide plate and the wavelength conversion film 16 according to the embodiment of the present invention such that one main surface of the wavelength conversion film 16 faces a light incident surface of the light guide plate, sandwiching the wavelength conversion film 16 between the light guide plate and the wavelength conversion film 16, and disposing the light source 18 on a surface opposite to the light guide plate. In the edge light type backlight unit, a plurality of light sources 18 may be typically disposed in a longitudinal direction of the light incident surface of the light guide plate, or an elongated light source may be disposed such that a longitudinal direction thereof matches the longitudinal direction of the light incident surface of the light guide plate.

Hereinabove, the wavelength conversion film and the backlight unit according to the embodiment of the present invention have been described in detail. However, the present invention is not limited to the above-described examples, and various improvements and modifications can be made within a range not departing from the scope of the present invention.

EXAMPLES

Hereinafter, the present invention will be described in more detail using specific examples according to the present invention. The present invention is not limited to Examples described below, and materials, used amounts, ratios, treatment details, treatment procedures, and the like shown in the following examples can be appropriately changed within a range not departing from the scope of the present invention.

Example 1

<Preparation of Dispersion>

A dispersion having the following composition was prepared.

Toluene dispersion (maximum emission wavelength: 530 nm) including quantum dots 1: 20 mass %

Toluene dispersion (maximum emission wavelength: 630 nm) including quantum dots 2: 2 mass %

Dicyclopentanyl acrylate (DCP) (FA-513AS, manufactured by Hitachi Chemical Co., Ltd.): 97 mass %

Photopolymerization initiator (IRGACURE TPO, manufactured by BASF SE): 2 mass %

As the quantum dots 1 and 2 that were wavelength conversion particles, nanocrystals having the following core-shell structure (InP/ZnS) were used.

Quantum dots 1: INP530-10 (manufactured by NN-Labs LLC.)

Quantum dots 2: INP620-10 (manufactured by NN-Labs LLC.)

Toluene was removed under reduced pressure while heating the obtained solution at 40° C. using an evaporator. As a result, a dispersion in which the quantum dots were dispersed in the matrix was prepared.

<Preparation of Binder Aqueous Solution>

As a binder of a wavelength conversion layer, PVA (partially saponified polyvinyl alcohol PVA 203, manufactured by Kuraray Co., Ltd.) was prepared.

This binder was put into pure water and was stirred to dissolve the binder while heating the solution at 80° C. As a result, a binder aqueous solution in which the binder (PVA) was dissolved in pure water was prepared. The concentration of the binder in the binder aqueous solution was 30 mass %.

The oxygen permeability coefficient of the binder was measured according to the following procedure. The prepared binder aqueous solution was applied to a PET film (COSMOSHINE A4300, manufactured by Toyobo Co., Ltd., thickness: 50 μm) and was heated and dried at 95° C. for 30 minutes. The thickness of the obtained coating film was 10 μm. The coating film was released from the PET film and was measured using a measuring device (OX-TRAN 2/21, manufactured by Mocon Inc.) with a MOCON method under conditions of temperature: 25° C. and relative humidity: 60% RH. As a result, the oxygen permeability coefficient of the binder was 0.008 (cc·mm)/(m$^2$·day·atm).

<Preparation of Emulsion and Coating Solution>

Using the dispersion and the binder aqueous solution prepared, a mixed solution having the following composition was prepared.

Dispersion: 5.8 parts by mass

Binder aqueous solution: 93.7 parts by mass 1 mass % aqueous solution of sodium dodecylsulfate (SDS, manufactured by Tokyo Chemical Industry Co., Ltd.): 0.5 parts by mass 50 cc of the mixed solution having the above-described composition and a stirrer (magnetic stirrer) were put into a φ35 mm vial. All the preparation operations of the mixed solution were performed in a glove box having an oxygen concentration of 300 ppm or lower. Further, the vial was covered in the glove box to hold the inside in a nitrogen purged state.

The vial into which the mixed solution and the stirrer were put was extracted from the glove box and was stirred using the stirrer at 1500 rpm for 30 minutes. As a result, an emulsion was prepared.

Next, while stirring the emulsion to maintain the emulsified state, the entire emulsion was irradiated with ultraviolet light using an air-cooled metal halide lamp (manufactured by Eye Graphics Co., Ltd.) of 160 W/cm to cure the matrix (DCP) of the dispersion and to form microparticles. As a result, a coating solution in which the microparticles were dispersed and emulsified in the aqueous solution of the binder (PVA) was prepared. The irradiation time of the ultraviolet light was 120 seconds.

The matrix of the microparticles was cured under completely the same conditions, and the oxygen permeability coefficient of the matrix was measured using the same method as that of the binder. As a result, the oxygen permeability coefficient of the matrix was 39 (cc·mm)/(m$^2$·day·atm).

<Preparation of Wavelength Conversion Film>

As a substrate, a PET film (COSMOSHINE A4300, manufactured by Toyobo Co., Ltd.) having a thickness of 50 μm was prepared.

The prepared coating solution was applied to one surface of the substrate using a die coater. Next, the coating solution was dried using a heater at 95° C. for 30 minutes. As a result, a wavelength conversion layer was formed on the substrate. The thickness of the formed wavelength conversion layer was 70 μm.

In a case where the obtained wavelength conversion layer was cut using a microtome to form a cross-section, and the cross-section was observed with an optical microscope (reflected light), it was found that the microparticles in which the phosphor (quantum dots) was dispersed in the matrix were dispersed in the wavelength conversion layer. In addition, in a case where the optical microscope image obtained in this procedure was analyzed and measured using image analysis software (ImageJ), the average particle size of the microparticles was 5 μm, and the content of the microparticles in the wavelength conversion layer was 17 vol %.

Next, a substrate (PET film) was laminated on the formed wavelength conversion layer and was bonded thereto using a pressure sensitive adhesive (8172CL, manufactured by 3M). As a result, a wavelength conversion film illustrated in FIG. 2 in which the wavelength conversion layer was sandwiched between the two substrates was prepared.

Example 2

A wavelength conversion film was prepared using the same method as in Example 1, except that the addition amount of the dispersion for forming the microparticles was changed in the preparation of the coating solution and the application amount of the coating solution to the substrate was changed.

The thickness of the wavelength conversion layer was 52 μm. In addition, in a case where the measurement was performed using the same method as that of Example 1, the average particle size of the microparticles was 5 μm, and the content of the microparticles in the wavelength conversion layer was 23 vol %.

Example 3

A wavelength conversion film was prepared using the same method as in Example 1, except that the addition amount of the dispersion for forming the microparticles was changed in the preparation of the coating solution and the application amount of the coating solution to the substrate was changed.

The thickness of the wavelength conversion layer was 43 μm. In addition, in a case where the measurement was performed using the same method as that of Example 1, the average particle size of the microparticles was 4 μm, and the content of the microparticles in the wavelength conversion layer was 28 vol %.

Example 4

A wavelength conversion film was prepared using the same method as in Example 1, except that the addition amount of the dispersion for forming the microparticles was changed in the preparation of the coating solution and the application amount of the coating solution to the substrate was changed.

The thickness of the wavelength conversion layer was 99 μm. In addition, in a case where the measurement was performed using the same method as that of Example 1, the average particle size of the microparticles was 6 μm, and the content of the microparticles in the wavelength conversion layer was 12 vol %.

Example 5

A wavelength conversion film was prepared using the same method as in Example 1, except that the addition amount of the dispersion for forming the microparticles was changed in the preparation of the coating solution and the application amount of the coating solution to the substrate was changed.

The thickness of the wavelength conversion layer was 120 μm. In addition, in a case where the measurement was performed using the same method as that of Example 1, the average particle size of the microparticles was 6 µm, and the content of the microparticles in the wavelength conversion layer was 6 vol %.

Example 6

A wavelength conversion film was prepared using the same method as in Example 1, except that the PVA as the binder of the wavelength conversion layer was changed from PVA 203 to PVA 103 (manufactured by Kuraray Co., Ltd.).

In a case where the particle size of the microparticles was measured using the same method as that of Example 1, the average particle size of the microparticles was 5 µm. In addition, in a case where the oxygen permeability coefficient of the binder was measured using the same method as that of Example 1. The oxygen permeability coefficient of the binder was 0.001 (cc·mm)/(m$^2$·day·atm).

Example 7

A wavelength conversion film was prepared using the same method as in Example 1, except that the compound for forming the matrix of the microparticles in the preparation of the dispersion was changed from dicyclopentanyl acrylate (DCP) to a mixture obtained by mixing DCP and tricyclodecane dimethanol diacrylate (A-DCP, manufactured by Shin-Nakamura Chemical Co., Ltd.) at a mass ratio of 80/20.

In a case where the particle size of the microparticles was measured using the same method as that of Example 1, the average particle size of the microparticles was 8 µm. In addition, in a case where the oxygen permeability coefficient of the matrix was measured using the same method as that of Example 1. The oxygen permeability coefficient of the matrix was 23 (cc·mm)/(m$^2$·day·atm).

Example 8

A wavelength conversion film was prepared using the same method as in Example 1, except that the compound for forming the matrix of the microparticles in the preparation of the dispersion was changed from DCP to a mixture obtained by mixing DCP and A-DCP, manufactured by Shin-Nakamura Chemical Co., Ltd.) at a mass ratio of 50/50.

In a case where the particle size of the microparticles was measured using the same method as that of Example 1, the average particle size of the microparticles was 10 µm. In addition, in a case where the oxygen permeability coefficient of the matrix was measured using the same method as that of Example 1. The oxygen permeability coefficient of the matrix was 11 (cc·mm)/(m$^2$·day·atm).

Example 9

A wavelength conversion film was prepared using the same method as in Example 1, except that the emulsifier to be added in the preparation of the coating solution was changed from SDS to BRIJ 30 (manufactured by Sigma-Aldrich Co., Llc., polyethylene glycol dodecyl ether, HLB value: 10.7) and the addition amount of the emulsifier was 0.2 mass % with respect to the total amount of the binder and the dispersion.

In a case where the particle size of the microparticles was measured using the same method as that of Example 1, the average particle size of the microparticles was 9 µm.

Example 10

A wavelength conversion film was prepared using the same method as in Example 1, except that the emulsifier to be added in the preparation of the coating solution was changed from SDS to BRIJ S10 (manufactured by Sigma-Aldrich Co., Llc., polyethylene glycol octadecyl ether, HLB value: 12.9) and the addition amount of the emulsifier was 0.2 mass % with respect to the total amount of the binder and the dispersion.

In a case where the particle size of the microparticles was measured using the same method as that of Example 1, the average particle size of the microparticles was 3 µm.

Example 11

A wavelength conversion film was prepared using the same method as in Example 1, except that the emulsifier to be added in the preparation of the coating solution was changed from SDS to BRIJ 020 (manufactured by Sigma-Aldrich Co., Llc., polyoxyethylene (20) oleyl ether, HLB value: 15.6) and the addition amount of the emulsifier was 0.2 mass % with respect to the total amount of the binder and the dispersion.

In a case where the particle size of the microparticles was measured using the same method as that of Example 1, the average particle size of the microparticles was 1.5 µm.

Example 12

A wavelength conversion film was prepared using the same method as in Example 1, except that the emulsifier to be added in the preparation of the coating solution was changed from SDS to BRIJ 93 (manufactured by Sigma-Aldrich Co., Llc., polyethylene glycol oleyl ether, HLB value: 5.9) and the addition amount of the emulsifier was 0.2 mass % with respect to the total amount of the binder and the dispersion.

In a case where the particle size of the microparticles was measured using the same method as that of Example 1, the average particle size of the microparticles was 13 µm.

Example 13

A wavelength conversion film was prepared using the same method as in Example 1, except that the quantum dots used as the phosphor in the preparation of the dispersion were changed from InP/ZnS to CdSe/ZnS (cadmium selenide/zinc sulfide, manufactured by NN-Labs, Lie, CZ-520 and CZ-620). The maximum emission wavelengths of the quantum dots were 520 nm and 620 nm, respectively.

In a case where the particle size of the microparticles was measured using the same method as that of Example 1, the average particle size of the microparticles was 5 µm.

Example 14

A wavelength conversion film was prepared using the same method as in Example 1, except that the binder of the wavelength conversion layer was changed from PVA (PVA203) to a butenediol-vinyl alcohol copolymer (BVOH, manufactured by The Nippon Synthetic Chemical Industry Co., Ltd., G polymer (AZF8035W)).

In a case where the particle size of the microparticles was measured using the same method as that of Example 1, the average particle size of the microparticles was 5 µm. In addition, in a case where the oxygen permeability coefficient of the binder was measured using the same method as that of Example 1. The oxygen permeability coefficient of the binder was lower than 0.001 (cc·mm)/(m$^2$·day·atm).

Example 15

A wavelength conversion film was prepared using the same method as in Example 1, except that the emulsifier (SDS) was not used in the preparation of the dispersion.

In a case where the particle size of the microparticles was measured using the same method as that of Example 1, the average particle size of the microparticles was 39 µm.

Comparative Example 1

A wavelength conversion film was prepared using the same method as in Example 1, except that the addition amount of the dispersion for forming the microparticles was changed in the preparation of the coating solution and the application amount of the coating solution to the substrate was changed.

The thickness of the wavelength conversion layer was 120 µm. In addition, in a case where the measurement was performed using the same method as that of Example 1, the average particle size of the microparticles was 5 µm, and the content of the microparticles in the wavelength conversion layer was 2 vol %.

Comparative Example 2

A wavelength conversion film was prepared using the same method as in Example 1, except that the addition amount of the dispersion for forming the microparticles was changed in the preparation of the coating solution and the application amount of the coating solution to the substrate was changed.

The thickness of the wavelength conversion layer was 34 µm. In addition, in a case where the measurement was performed using the same method as that of Example 1, the average particle size of the microparticles was 5 µm, and the content of the microparticles in the wavelength conversion layer was 35 vol %.

Comparative Example 3

A wavelength conversion film was prepared using the same method as in Example 1, except that the compound for forming the matrix of the microparticles in the preparation of the dispersion was changed from DCP to LA (lauryl acrylate, manufactured by Osaka Organic Chemical Industry Ltd.).

In a case where the particle size of the microparticles was measured using the same method as that of Example 1, the average particle size of the microparticles was 3 µm. In addition, in a case where the oxygen permeability coefficient of the matrix was measured using the same method as that of Example 1. The oxygen permeability coefficient of the matrix was 1300 (cc·mm)/(m²·day·atm).

Comparative Example 4

A wavelength conversion film was prepared using the same method as in Example 1, except that the compound for forming the matrix of the microparticles in the preparation of the dispersion was changed from DCP Trimethylolpropane triacrylate (TMPTA, manufactured by Daicel-Allnex Ltd.).

In a case where the particle size of the microparticles was measured using the same method as that of Example 1, the average particle size of the microparticles was 12 µm. In addition, in a case where the oxygen permeability coefficient of the matrix was measured using the same method as that of Example 1. The oxygen permeability coefficient of the matrix was 2 (cc·mm)/(m²·day·atm).

Comparative Example 5

A wavelength conversion film was prepared using the same method as in Example 1, except that the PVA as the binder of the wavelength conversion layer was changed from PVA 203 to PVA 505 (manufactured by Kuraray Co., Ltd.).

In a case where the particle size of the microparticles was measured using the same method as that of Example 1, the average particle size of the microparticles was 3 µm. In addition, in a case where the oxygen permeability coefficient of the binder was measured using the same method as that of Example 1. The oxygen permeability coefficient of the binder was 0.3 (cc·mm)/(m²·day·atm).

<Measurement of Haze>

The haze of the prepared wavelength conversion film was measured using NDH 5000 (manufactured by Nippon Denshoku Industries Co., Ltd.) according to JIS K 7136.

<Measurement of Initial Luminance>

A commercially available tablet terminal (trade name "Kindle" (registered trade name) Fire HDX7", manufactured by Amazon Co., Ltd.) including a blue light source in a backlight unit was disassembled to extract the backlight unit. Instead of a wavelength conversion film quantum dot enhancement film (QDEF) incorporated into the backlight unit, each of wavelength conversion films according to Examples and Comparative Examples cut in a rectangular shape (50×50 mm) was incorporated. This way, a backlight unit was prepared.

The prepared backlight unit was turned on, and an initial luminance value $Y_0$ (cd/m²) thereof was measured using a luminance colorimeter (trade name: "SR3", manufactured by Topcon Corporation) that was provided at a distance of 520 mm from a surface of a light guide plate in the vertical direction such that the entire surface was displayed white. The initial luminance value $Y_0$ was evaluated based on the following evaluation standards.

—Evaluation Standards—

A: $Y_0 \geq 530$
B: $530 > Y_0 \geq 515$
C: $515 > Y_0 \geq 500$
D: $500 > Y_0$ <Measurement of Light Fastness>

The backlight unit was turned on for 1000 hours after the measurement of the initial luminance, and then the luminance was measured again as a luminance value Y1 after the test.

Light fastness [%] was calculated from the following expression based on the initial luminance value $Y_0$ and the luminance value $Y_1$ after the test and was evaluated based on the following evaluation standards.

Light Fastness [%]=$(Y_1/Y_0) \times 100$

—Evaluation Standards—

A: light fastness≥95%
B: 95>light fastness≥90%
C: 90>light fastness≥80%
D: light fastness<80%

<Evaluation of In-Plane Chromaticity Unevenness>

A CIE x,y chromaticity was measured using the same evaluation device as that of the measurement of the initial luminance value $Y_0$, and a chromaticity variation value Δxy was calculated from an average value of in-plane 9 points.

The chromaticity variation value Δxy was evaluated based on the following evaluation standards.
—Evaluation Standards—
A: Δxy≤0.005
B: 0.005<Δxy≤0.010
C: 0.010<Δxy≤0.015
D: 0.015<Δxy
The results are shown in the following table.

wavelength conversion layer is 3 to 30 vol %, the haze is high, high-luminance emission is realized with high durability, the in-plane chromaticity unevenness is also low, and the adhesiveness is excellent.

On the other hand, in Comparative Example 1 in which the content of the microparticles was low, the luminance was low. Conversely, in Comparative Example 2 in which the content of the microparticles was excessively high, deterio-

TABLE 1

| | Wavelength Conversion Layer | | | | | | | | |
|---|---|---|---|---|---|---|---|---|---|
| | Forming Material | | | Oxygen Permeability Coefficient | | Microparticles | | Emulsifier | |
| | Phosphor | Matrix | Binder | Binder | Matrix | Content [vol %] | Particle Size [μm] | Material | Content [mass %] |
| Example 1 | InP/ZnS | DCP | PVA203 | 0.008 | 39 | 17 | 5 | SDS | 0.1 |
| Example 2 | InP/ZnS | DCP | PVA203 | 0.008 | 39 | 23 | 5 | SDS | 0.1 |
| Example 3 | InP/ZnS | DCP | PVA203 | 0.008 | 39 | 28 | 4 | SDS | 0.1 |
| Example 4 | InP/ZnS | DCP | PVA203 | 0.008 | 39 | 12 | 6 | SDS | 0.1 |
| Example 5 | InP/ZnS | DCP | PVA203 | 0.008 | 39 | 6 | 6 | SDS | 0.1 |
| Example 6 | InP/ZnS | DCP | PVA103 | 0.001 | 39 | 17 | 5 | SDS | 0.1 |
| Example 7 | InP/ZnS | DCP/A-DCP | PVA203 | 0.008 | 23 | 17 | 8 | SDS | 0.1 |
| Example 8 | InP/ZnS | DCP/A-DCP | PVA203 | 0.008 | 11 | 17 | 10 | SDS | 0.1 |
| Example 9 | InP/ZnS | DCP | PVA203 | 0.008 | 39 | 17 | 9 | BRIJ 30 | 0.2 |
| Example 10 | InP/ZnS | DCP | PVA203 | 0.008 | 39 | 17 | 3 | BRIJ S10 | 0.2 |
| Example 11 | InP/ZnS | DCP | PVA203 | 0.008 | 39 | 17 | 1.5 | BRIJ O20 | 0.2 |
| Example 12 | InP/ZnS | DCP | PVA203 | 0.008 | 39 | 17 | 13 | BRIJ 93 | 0.2 |
| Example 13 | CdSe/ZnS | DCP | PVA203 | 0.008 | 39 | 17 | 5 | SDS | 0.1 |
| Example 14 | InP/ZnS | DCP | BVOH | <0.001 | 39 | 17 | 5 | SDS | 0.1 |
| Example 15 | InP/ZnS | DCP | PVA203 | 0.008 | 39 | 17 | 39 | — | — |
| Comparative Example 1 | InP/ZnS | DCP | PVA203 | 0.008 | 39 | 2 | 5 | SDS | 0.1 |
| Comparative Example 2 | InP/ZnS | DCP | PVA203 | 0.008 | 39 | 35 | 5 | SDS | 0.1 |
| Comparative Example 3 | InP/ZnS | LA | PVA103 | 0.008 | 1300 | 17 | 3 | SDS | 0.1 |
| Comparative Example 4 | InP/ZnS | TMPTA | PVA203 | 0.008 | 2 | 17 | 12 | SDS | 0.1 |
| Comparative Example 5 | InP/ZnS | DCP | PVA505 | 0.3 | 39 | 17 | 3 | SDS | 0.1 |

| | Wavelength Conversion Layer | | Wavelength Conversion Film Haze | Evaluation | | |
|---|---|---|---|---|---|---|
| | Emulsifier | | | | | |
| | HLB Value | Thickness [μm] | | Luminance | Light Fastness | Chromaticity Unevenness |
| Example 1 | 11.7 | 70 | 97 | A | A | A |
| Example 2 | 11.7 | 52 | 96 | A | A | A |
| Example 3 | 11.7 | 43 | 95 | A | B | A |
| Example 4 | 11.7 | 99 | 98 | A | A | A |
| Example 5 | 11.7 | 120 | 98 | B | A | A |
| Example 6 | 11.7 | 70 | 97 | A | A | A |
| Example 7 | 11.7 | 70 | 97 | B | A | A |
| Example 8 | 11.7 | 70 | 97 | B | A | A |
| Example 9 | 10.7 | 70 | 97 | A | A | A |
| Example 10 | 12.9 | 70 | 97 | A | A | A |
| Example 11 | 15.6 | 70 | 97 | A | A | B |
| Example 12 | 5.9 | 70 | 97 | A | A | B |
| Example 13 | 11.7 | 70 | 97 | A | A | A |
| Example 14 | 11.7 | 70 | 97 | A | A | A |
| Example 15 | — | 70 | 42 | A | A | B |
| Comparative Example 1 | 11.7 | 120 | 98 | D | A | A |
| Comparative Example 2 | 11.7 | 34 | 92 | A | C | A |
| Comparative Example 3 | 11.7 | 70 | 97 | A | D | A |
| Comparative Example 4 | 11.7 | 70 | 97 | C | A | A |
| Comparative Example 5 | 11.7 | 70 | 97 | A | D | A |

The unit of the oxygen permeability coefficient is "(cc · mm)/(m$^2$ · day · atm)"
In Example 7, a mass ratio DCP/A-DCP was 80/20
In Example 8, a mass ratio DCP/A-DCP was 50/50

As illustrated in the table, in the wavelength conversion film according to the embodiment of the present invention in which the oxygen permeability coefficient of the binder is 0.01 (cc·mm)/(m$^2$·day·atm) or lower, the oxygen permeability coefficient of the matrix was 10 to 1000 (cc·mm)/(m$^2$·day·atm), and the content of the microparticles in the ration of the phosphor caused by oxygen occurred. Therefore, the light fastness was low, and the adhesiveness was also poor. In Comparative Example 3 in which the oxygen permeability coefficient of the matrix in the microparticles was high, deterioration of the phosphor caused by oxygen also occurred. Therefore, the light fastness was low, and the adhesiveness was also poor. In Comparative Example 4 in which the oxygen permeability coefficient of the matrix in the microparticles was low, the phosphor was not able to be appropriately dispersed in the microparticles, and the luminance was low. In Comparative Example 5 in which the content of the microparticles was excessively high and the emulsifier was not included, the evaluation results of all the evaluation items were low. Further, in Comparative Example 6 in which the oxygen permeability coefficient of the binder of the wavelength conversion layer was high, deterioration of the phosphor caused by oxygen occurred. Therefore, the light fastness was low.

As can be seen from the above results, the effects of the present invention are obvious.

The present invention is suitably applicable to a backlight of an LCD.

EXPLANATION OF REFERENCES

10: backlight unit
14: case
16: wavelength conversion film
18: light source
26: wavelength conversion layer
28: substrate
32: binder
34: microparticle
36: matrix
38: phosphor

What is claimed is:

1. A wavelength conversion film comprising:
a wavelength conversion layer; and
a substrate that supports the wavelength conversion layer,
wherein the wavelength conversion layer includes a binder and microparticles,
the microparticles include a phosphor and a matrix,
the matrix is solely a material within which the phosphor is dispersed,
an oxygen permeability coefficient of the binder is 0.01 (cc·mm)/(m$^2$·day·atm) or lower,
an oxygen permeability coefficient of the matrix is 10 to 1000 (cc·mm)/(m$^2$·day·atm), and
a content of the microparticles in the wavelength conversion layer is 3 to 30 vol %.

2. The wavelength conversion film according to claim 1, wherein the wavelength conversion layer includes 0.01 to 5 mass % of an emulsifier.

3. The wavelength conversion film according to claim 2, wherein a HLB value of the emulsifier represented by the following expression is 8 to 18, HLB value=20×(the sum of formula weights of hydrophilic groups/molecular weight).

4. The wavelength conversion film according to claim 1, wherein an internal haze is 50% or higher.

5. The wavelength conversion film according to claim 1, wherein a thickness of the wavelength conversion layer is 10 to 100 μm.

6. The wavelength conversion film according to claim 1, wherein an average particle size of the microparticles is 0.5 to 20 μm.

7. The wavelength conversion film according to claim 1, wherein the substrate is provided on one main surface of the wavelength conversion layer or the wavelength conversion layer is sandwiched between two substrates, and
an oxygen permeability of the substrate is 0.1 to 100 cc/(m$^2$·day·atm).

8. The wavelength conversion film according to claim 1, wherein two or more wavelength conversion layers are provided, and
emission wavelengths of phosphors included in the wavelength conversion layers are different from each other.

9. A backlight unit comprising:
the wavelength conversion film according to claim 1; and
a light source that emits excitation light exciting the phosphor included in the wavelength conversion layer of the wavelength conversion film.

* * * * *